July 13, 1926.
F. FREEMAN
EYE TESTING CABINET
Filed March 11, 1925
1,591,969
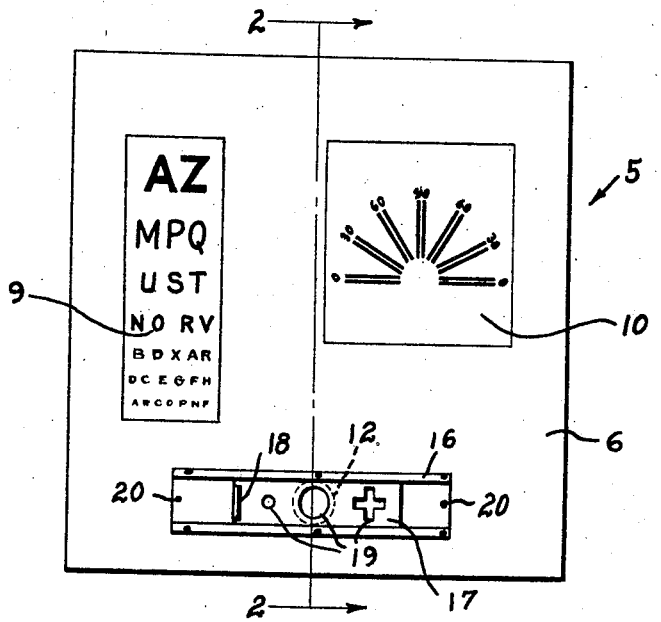
Fig. 1.
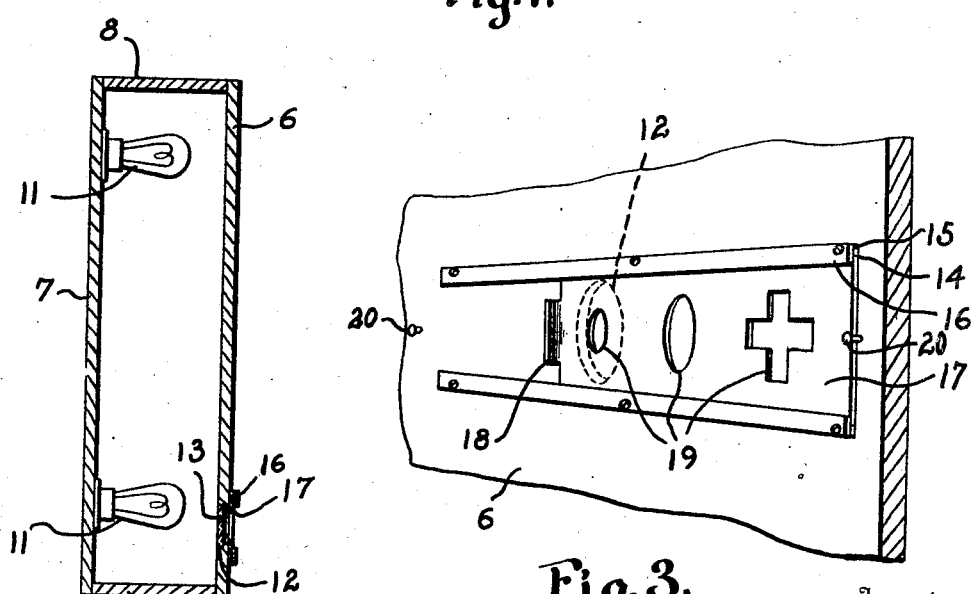
Fig. 2.
Fig. 3.
Inventor
Fay Freeman
By Harry H. Styll
Attorney Patented July 13, 1926.

1,591,969

UNITED STATES PATENT OFFICE.

JAY FREEMAN, OF CHICAGO, ILLINOIS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-TESTING CABINET.

Application filed March 11, 1925. Serial No. 14,717.

This invention relates to new and useful improvements in eye testing cabinets, and has as an object to improve and render more efficient the muscle testing portion of these cabinets.

It is an object of this invention to provide an eye testing cabinet having a plurality of fixation objects capable of selective use.

Another object of this invention is to provide a plurality of fixation objects for use in muscle testing so arranged that the operator may easily shift from one fixation object to another with a minimum amount of trouble.

Still another object of this invention is to provide a structure for displaying fixation objects which may easily be applied to any of the eye testing cabinets now in use.

A still further object of this invention is to provide a structure for displaying fixation objects which shall be simple in construction, cheap to manufacture, and yet thoroughly adapted for all purposes desired.

Other objects and advantages of this invention, together with the details of construction and method of operation of the same, will readily become apparent during the course of the following description.

In the drawing forming a part of this specification, wherein I have employed like numerals to designate corresponding parts throughout all views of the same:

Figure 1 is a front elevation of a test cabinet embodying my invention;

Figure 2 is a transverse sectional view of the same taken on line 2—2 of Figure 1; and Figure 3 is a detail perspective view of a portion of the cabinet more clearly illustrating the invention.

In the drawing forming a part of this specification, and in which I have shown the preferred embodiment of this invention, the numeral 5 designates broadly an eye testing cabinet provided with the front wall 6, a rear wall 7, and suitable side walls 8. The front wall 6 is provided with the usual visual acuity test chart 9 and the astigmatic chart 10, both of which are adapted to be illuminated from in back by means of suitable incandescent lamps 11 mounted in the rear wall 7 of the cabinet.

In eye testing cabinets the structure as thus far disclosed is substantially that of the usual type, and it is the custom to provide these cabinets with some kind of a fixation object whereby the muscles of the patient's eyes may be tested. In the past, however, in so far as I am aware, it has been customary to provide merely an individual fixation object incapable of adjustment or alteration in any way. In order, therefore, to eliminate the necessity of relying upon a single fixation object, I modify the usual structure of these cabinets by providing adjacent but spaced from the lower edge of the front wall 6, a suitable window 12 in which I mount a pane of glass 13. In practical use I find that frosted glass is particularly applicable for use in this pane, but I do not care to limit myself to this particular kind of glass, in that there may easily be inserted in the window either colored glass or glass having certain properties particularly desired for testing individual cases. Arranged on either side of the window 12 and parallel to each other, are the trackways 14, comprising the base members 15 and suitable overhanging top members 16.

A slide 17, provided with a suitable handle 18 and the indicia 19 is movably mounted in the trackways 14, and is adapted to be shifted relative to the window 12, so that the indicia 19 may be selectively positioned before the window. Although I have shown the indicia 19 to be formed by stamping the same from the slide 17, it is to be understood that they may be formed in any way, provided they will be illuminated and set off in relief when positioned before the window 12. These indicia form suitable fixation objects for use in muscle testing, and may take any shape desired, although in this particular case I have shown the same to comprise a small circle, a larger circle, and a Greek cross. Suitable stop members 20 mounted adjacent the ends of the trackways 14 limit the movement of the slide 17 and prevent the same from being moved out of the trackways.

From the foregoing description it may clearly be seen that I have provided means whereby a plurality of fixation objects are adjustably supported before an illuminated window, and whereby any one of the fixation objects may be selectively positioned before the window for individual use. It may also clearly be seen that the fixation objects may easily be shifted in a second's time, and the operator given a choice as to the shape or size of the fixation object to be used.

While I have shown and described that form of my invention which I desire to consider as the preferred embodiment of the same, it is to be expected that in the practical construction and use of the same various changes as to size, shape, and arrangement of parts will suggest themselves, so that I reserve the right to make these changes in so far as I remain within the spirit of the invention and the scope of the appended claims.

Having thus described my invention, I claim:

1. In a device of the character described, a cabinet having opaque walls with a plurality of illuminated sections thereon comprising a visual acuity test lettered section, an astigmatic test lined section and a fixation point section having a plurality of different shaped fixation objects, illuminating means in the cabinet, and means to move the fixation objects into or out of the field of illumination.

2. In a device of the character described, a cabinet having opaque walls with a plurality of illuminated sections thereon comprising a visual acuity test lettered section, an astigmatic test lined section and a fixation point section having a circular and a cross shaped fixation object, illuminating means in the cabinet, and means to move the fixation circle and cross into or out of the field of the illumination.

3. In a device of the character described, a cabinet with opaque walls having a plurality of illuminated sections thereon comprising a visual acuity test lettered section, an astigmatic test lined section and a fixation point section having a slide way adjacent thereto, a slide in the slide way having a plurality of different shaped fixation objects, and illuminating means in the cabinet, whereby the slide may be moved in the slide way to position the desired fixation object in the field of illumination.

FAY FREEMAN.